(12) United States Patent
Cyrusian

(10) Patent No.: US 6,552,865 B2
(45) Date of Patent: Apr. 22, 2003

(54) DIAGNOSTIC SYSTEM FOR A READ/WRITE CHANNEL IN A DISK DRIVE

(75) Inventor: Sasan Cyrusian, Scotts Valley, CA (US)

(73) Assignee: Infineon Technologies AG, Munich (DE)

(*) Notice: Subject to any disclaimer, the term of this patent is extended or adjusted under 35 U.S.C. 154(b) by 0 days.

(21) Appl. No.: 09/865,651

(22) Filed: May 25, 2001

(65) Prior Publication Data

US 2002/0176184 A1 Nov. 28, 2002

(51) Int. Cl.⁷ .......................... G11B 27/36; G11B 5/02; G11B 5/09
(52) U.S. Cl. .............................. 360/31; 360/25; 360/46
(58) Field of Search ............................... 360/25, 31, 46

(56) References Cited

U.S. PATENT DOCUMENTS

| | | | |
|---|---|---|---|
| 6,268,972 B1 * | 7/2001 | Philpott et al. | 360/46 |
| 6,313,961 B1 | 11/2001 | Armstrong et al. | 360/46 |
| 6,314,480 B1 * | 11/2001 | Nemazie et al. | 710/74 |
| 6,369,741 B1 * | 4/2002 | Demicheli et al. | 341/155 |
| 6,480,064 B1 * | 11/2002 | Cyrusian | 330/253 |
| 6,480,128 B1 * | 11/2002 | Bach et al. | 341/122 |
| 6,498,574 B2 * | 12/2002 | Blon | 341/144 |
| 6,501,324 B2 * | 12/2002 | Ruegg et al. | 327/408 |
| 6,512,404 B2 * | 1/2003 | Ruegg et al. | 327/157 |

(List continued on next page.)

FOREIGN PATENT DOCUMENTS

| | | |
|---|---|---|
| EP | 0 987 706 A2 | 3/2000 |
| EP | 0 987 706 A3 | 4/2000 |

OTHER PUBLICATIONS

"Synchronous Recording Channels—PRML & Beyond", rev. 5.61 14.E.18, 1999, published by Knowledge Tek, Inc., Broomfield, Colorado.
"PRML: Seagate Uses Space Age Technology" available on the internet at http://www.seagate.com/support/kb/disc/prml.html, 2 pages, last accessed Apr. 9, 2001.
"Technologies—PRML" available on the Internet at http://www.idema.org/about/industry/ind_tech_prml.html, 1 page, last accessed Apr. 9, 2001.
"Reference Guide—Hard Disk Drives" available on the Internet at http://www.storagereview.com/guide2000/ref/hdd, 13 pages, last accessed Apr. 9, 2001.
"MR and PRML: Technologies in Synergy" available at on the Internet at http://www.lionsgate.com/Home/Baden/public_index/SCSI/Quantum_White_Papers/MR_Head/MR, 4 pages, last accessed Apr. 9, 2001.
"A Tutorial on Convolutional Coding with Viterbi Decoding" availbable on the Internet at http://pw1.netcom.com/~chip.f/viterbi/tutorial.html, 10 pages, last accessed Apr. 9, 2001.
G.T. Davis, "Dual Successive Approximation Register in Multichannel Analog–to–Digital Interface," IBM Technical Disclosure Bulletin, vol. 27, No. 9, pp. 5303–5305, Feb. 1985.

Primary Examiner—Regina N. Holder
(74) Attorney, Agent, or Firm—Richard K. Clark; Brinks Hofer Gilson & Lione

(57) ABSTRACT

The invention provides a read/write channel with a diagnostic system for a disk drive. The diagnostic system may process internal and external signals. The read/write channel may have one or more clock generators, a digital to analog converter, an analog comparator, and a successive approximation register. The read/write channel may be implemented on an integrated circuit or a complementary metal oxide semiconductor. The read/write channel may have partial response maximum likelihood (PRML) encoding and decoding. The diagnostic system uses bit-weighing or successive approximation to convert analog signals into digital diagnostic signals.

14 Claims, 4 Drawing Sheets

U.S. PATENT DOCUMENTS

| | | | | |
|---|---|---|---|---|
| 6,519,103 | B2 * | 2/2003 | Cyrusian | 360/46 |
| 6,525,613 | B2 * | 2/2003 | Cyrusian | 331/17 |
| 2002/0175724 | A1 * | 11/2002 | Cyrusian et al. | 327/172 |
| 2002/0175729 | A1 * | 11/2002 | Cyrusian | 327/274 |
| 2002/0175731 | A1 * | 11/2002 | Blon et al. | 327/307 |
| 2002/0175738 | A1 * | 11/2002 | Cyrusian | 327/337 |
| 2002/0175758 | A1 * | 11/2002 | Cyrusian et al. | 330/254 |
| 2002/0175761 | A1 * | 11/2002 | Bach et al. | 330/277 |
| 2002/0175765 | A1 * | 11/2002 | Cyrusian | 330/305 |
| 2002/0175771 | A1 * | 11/2002 | Cyrusian | 331/25 |
| 2002/0175772 | A1 * | 11/2002 | Cyrusian et al. | 331/57 |
| 2002/0176188 | A1 * | 11/2002 | Ruegg et al. | 360/46 |
| 2002/0176189 | A1 * | 11/2002 | Cryusian | 360/46 |
| 2002/0176194 | A1 * | 11/2002 | Ruegg et al. | 360/51 |
| 2002/0176196 | A1 * | 11/2002 | Cyrusian | 360/65 |
| 2002/0176197 | A1 * | 11/2002 | Franck et al. | 360/67 |
| 2002/0176198 | A1 * | 11/2002 | Cyrusian et al. | 360/68 |

* cited by examiner

DIAGNOSTIC SYSTEM FOR A READ/WRITE CHANNEL IN A DISK DRIVE

FIELD

This invention generally relates to disk drives and other data storage devices. More particularly, this invention relates to disk drives having read/write channels with diagnostic digital to analog converters.

BACKGROUND

Disk drives are used as data storage components for computer systems and other electronic devices. Disk drives include computer hard disk drives, fixed disk drives, and the like. In general, disk drives have lower costs, higher storage capacities, higher reliability, lower power consumption, higher data transfer speed, and smaller physical size than other data storage devices.

A disk drive usually has one or more rotating magnetic disks encased within a housing. The disk drive includes various components for reading and writing data onto the magnetic disks and for interfacing with other devices. Typically, one or more read/write heads are positioned above the magnetic disks to read and write data. The read/write heads may be positioned on each side of a magnetic disk. The read/write head essentially forms the interface between a magnetic disk and the electronic components of the disk drive.

Each read/write head generates or senses electromagnetic fields or magnetic encodings on the magnetic disk as areas of magnetic flux. The presence or absence of flux reversals in the electromagnetic fields represents the data stored on the magnetic disk. A flux reversal is a change in the magnetic flux on contiguous areas of the magnetic disk. The presence or absence of magnetic flux reversals correspond to binary 1's and 0's of a diagnostic input signal. To "write" data onto a magnetic disk, electronic components receive data from a host device and translate the data into magnetic encodings. The head transfers the magnetic encodings onto a portion of the magnetic disk. To "read" data from the magnetic disk, the head is positioned adjacent to the portion of the magnetic disk having the desired magnetic encodings. The head senses and transfers the magnetic encodings from the magnetic disk. The electronic components translate the magnetic encodings into the data, which is transferred to the host device. The host device may be a personal computer or other electronic equipment. The electronic components may apply error detection and correction algorithms to ensure accurate storage and retrieval of data from the magnetic disk. To improve data storage densities on disk drives, magneto resistive and inductive read/write heads have been developed with increased sensitivity to sense smaller amplitude magnetic signals and with increased signal discrimination.

Typically, a hard drive reads data by "peak detection"— detecting a voltage peak created when a flux reversal on a magnetic disk passes underneath the read/write head. However, a partial response maximum likelihood (PRML) algorithm has been developed to improve peak detection as densities and rotational speeds increase. PRML is implemented in the disk drive electronics to interpret the magnetic signals sensed by the read/write heads. PRML disk drives read the analog waveforms generated by the magnetic flux reversals stored on the disk. Rather than look for peak values to indicate flux reversals, PRML digitally samples the analog waveform (the "partial response" portion of the algorithm) and applies signal processing methodologies to determine the bit pattern represented by the waveform (the "maximum likelihood" portion of the algorithm).

The electric and mechanical components of the disk drive typically include a spindle motor, an actuator assembly, the read/write heads, amplifiers, a read/write channel, and a controller. There may be additional or different components having other configurations. The spindle motor holds and turns the magnetic disks. The actuator assembly positions the read/write heads adjacent to the magnetic disks. The amplifiers increase the signals between the read/write heads and the read/write channel. The controller interfaces between the read/write channel and the host device.

The read/write channel usually is implemented on an integrated circuit, which may be a complementary metal oxide semiconductor (CMOS). Many hard drives include an additional digital to analog converter (DAC) and an additional analog to digital converter (ADC) for diagnostic testing of the read/write channel. These DAC and ADC are in addition to the other digital to analog converters and analog to digital converters used to perform the reading and writing operations in the read/write channel. Typically, the additional ADC and DAC are used for diagnostic testing when the read/write channel is manufactured. Often after manufacturing, no additional diagnostic testing of the read/write channel is performed using the additional ADC or DAC.

The additional DAC has a resolution of about seven bits and receives input from one or more of the digital components in the read/write channel. The additional DAC provides a DAC output voltage or analog signal corresponding to the performance of the digital components in the read/write channel. The DAC output voltage may be connected to a measurement or display device to determine whether the components in the read/write channel are operating within acceptable parameters. The DAC output voltage may pass through a multiplexer, where the DAC output voltage is processed with one or more output voltage signals from the analog components in the read/write channel. The output voltage signals correspond to the performance of the analog components in the read/write channel. From the multiplexer, the DAC output voltage and the output voltage signals may pass through a pin driver buffer. The pin driver buffer helps distinguish between the output signals and may provide the output signals to the measurement or display device.

The additional ADC receives an input voltage or analog signal from outside or inside the read/write channel. The additional ADC produces a digital output for diagnostic testing of external and internal components. The input voltage may vary, which would change the digital output and thus provide additional testing parameters. The ADC usually operates at a moderate speed and has a resolution of about six to seven bits. The additional ADC usually has a flash or direct conversion, an integrating, a sigma-delta or over sampling, or a pipeline design. These ADC designs increase the hardware requirements and thus the size and costs of the read/write channel.

SUMMARY

This invention provides a read/write channel with a diagnostic system for a disk drive. The diagnostic system uses bit-weighing or successive approximation to convert an analog input signal into a digital diagnostic signal.

The disk drive may have a read/write channel and a diagnostic system. The read/write channel may be implemented on an integrated circuit. The diagnostic system may have bit-weighing conversion and a diagnostic output responsive to a diagnostic input voltage. The diagnostic system may include a digital to analog converter, an analog comparator, and a successive approximation register. The digital to analog converter may have an analog output responsive to a diagnostic input signal. The analog comparator may be coupled to compare the diagnostic input voltage with the analog output. The successive approximation register may be coupled to receive at least one register value from the analog comparator, the successive approximation register having the diagnostic output responsive to the at least one register value.

The read/write channel for a disk drive may be implemented on an integrated circuit and may have a digital to analog converter, an analog comparator, and a successive approximation register. The digital to analog converter may be coupled to receive at least one clock signal. The digital to analog converter may have an analog output responsive to a diagnostic input signal and the at least one clock signal. The analog comparator may be coupled to compare a diagnostic input voltage with the analog output from the digital to analog converter. The successive approximation register may be coupled to receive at least one register value from the analog comparator. The successive approximation register may have a diagnostic output responsive to the at least one register value.

The read/write channel for a disk drive may be implemented on a complementary metal oxide semiconductor and may have partial response maximum likelihood (PRML) encoding and decoding. The read/write channel may have a digital multiplexer, one or more clock generators, a digital to analog converter, a first analog multiplexer, a pin driver buffer, an analog comparator, and a successive approximation register. The digital to analog converter may be coupled to receive a diagnostic input signal from the digital multiplexer. The digital to analog converter also may be coupled to receive one or more clock signals from the clock generators. The digital to analog converter may generate an analog output voltage in response to the diagnostic input signal and the clock signals. The first analog multiplexer may be coupled to receive the analog output voltage from the digital to analog converter. The pin driver buffer may be coupled to receive the analog output voltage and one or more test signals from the first analog multiplexer. The analog comparator may be coupled to receive the analog output voltage from the digital to analog converter. The analog comparator may compare the analog output voltage with the diagnostic input voltage. The successive approximation register may be coupled to receive one or more register value from the analog comparator. The successive approximation register may provide a diagnostic output signal in response to the one or more register values. The digital multiplexer may be coupled to receive the diagnostic output signal from the successive approximation register.

Other systems, methods, features, and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF THE FIGURES

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

DETAILED DESCRIPTION OF THE PREFERRED EMBODIMENTS

Figure 1:
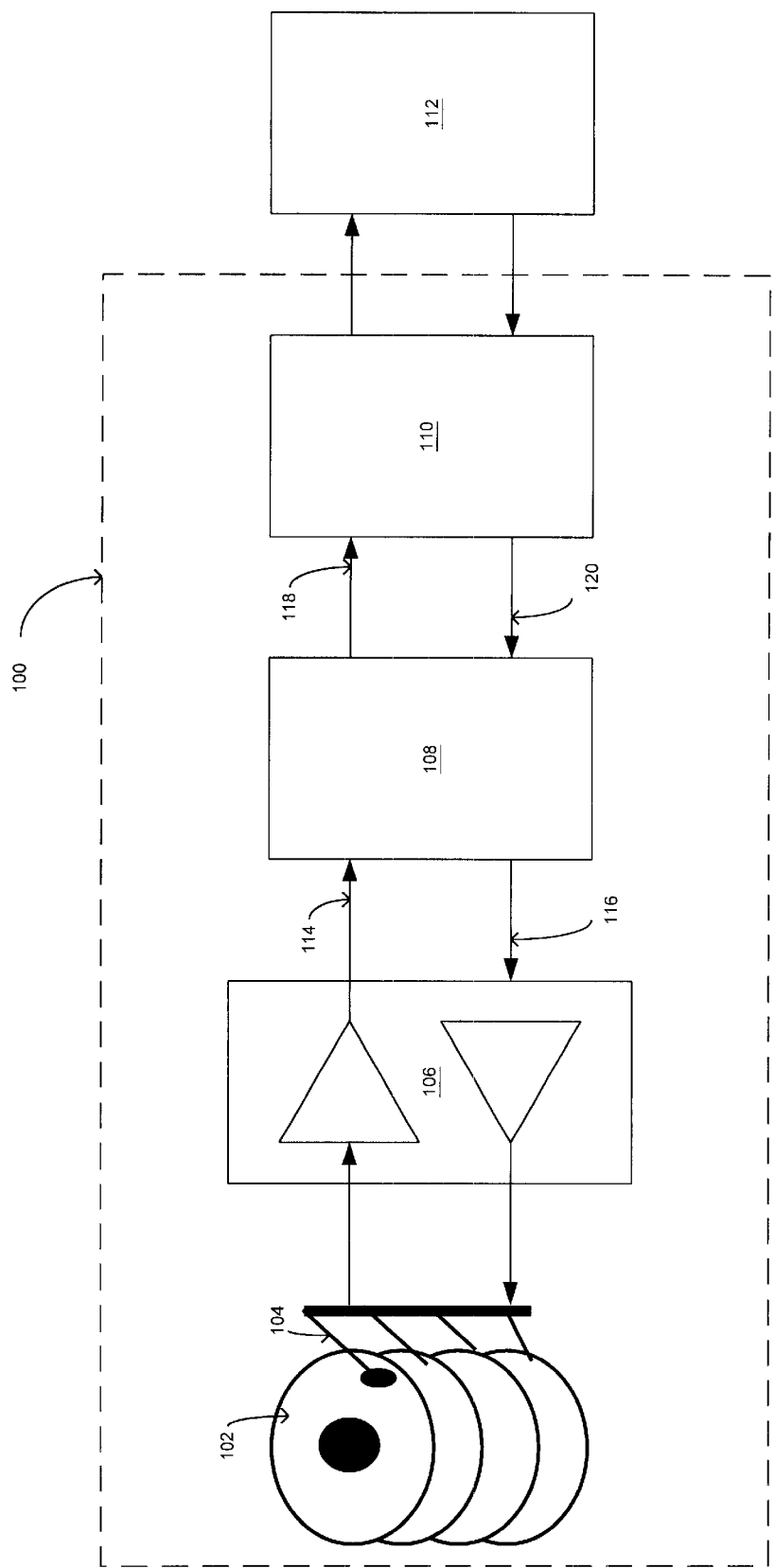
FIG. 1 represents a block diagram of an embodiment of a host device coupled to a disk drive having a read/write channel with a diagnostic system.

FIG. 1 represents a block diagram of an embodiment of a host device 112 coupled to a disk drive 100 having a read/write channel 108 with a diagnostic system. The disk drive 100 may be a hard disk drive, a fixed disk drive, or the like. The host device 112 may be a computer or other electronic device. The disk drive 100 also may include one or more magnetic disks and a spindle motor 102, one or more read/write heads and an actuator assembly 104, amplifiers 106, and a controller 110. The amplifiers 106 may be coupled with the read/write channel 108 via interfaces 114 and 116. The controller 110 may be coupled with the read/write channel 108 via interfaces 118 and 120. "Coupled with" includes directly connected to or indirectly connected with through one or more intermediate components. Such intermediate components may be hardware, software, or a combination of hardware and software. The disk drive 100 may have other configurations and may have fewer or additional components such as an actuator motor control.

The read/write channel 108 converts a diagnostic input signal from the host device 112 into electrical impulses. The read/write heads 104 are operatively disposed adjacent to the magnetic disks 102 to magnetically record data onto the magnetic disks 102 in response to the electrical pulses. The read/write heads 104 also are operatively disposed adjacent to the magnetic disks 102 to sense magnetic flux reversals on the magnetic disks 102. The read/write channel 108 receives an analog waveform generated by the read/write heads 104 in response to the flux reversals on the magnetic disks 102. The read/write channel 108 converts the analog waveform into binary digital data for use by the host device 112. The read/write heads 104 may sense or generate the flux reversals by peak detection, by partial response maximum likelihood (PRML) encoding and decoding, or the like.

To read data from the magnetic disks 102, the host device 112 provides a location identifier to the disk drive. The location identifier identifies the location of the data on the magnetic disks 102. The location identifier may be a cylinder and sector address. The controller 110 receives the location identifier and determines the physical location of the data on the disks 102. The controller 110 causes one or more of the read/write heads 104 to move into the proper position for the data on the magnetic disks 102 to spin adjacent to the read/write heads 104. As the magnetic disks 102 spin, the read/write heads 104 sense the presence or absence of flux reversals on the magnetic disks 102. The read/write heads generate an analog signal in response to the flux reversals. The read/write heads 104 pass the analog signal to the amplifiers 106, which amplify and pass the analog signal to the read/write channel 108 via the interface 114. The read/write channel 108 receives the amplified analog signal from the amplifiers 106 and decodes the amplified analog signal into a diagnostic input signal. The read/write channel 108 passes the diagnostic input signal to the controller 110 via the interface 118. The controller 110 passes the diagnostic input signal to the host device 112, which may have caching or error detection/correction to increase the speed and reliability of the hard drive 100.

To write data onto the magnetic disks 102, the host device 112 provides the controller 110 with the diagnostic input signal and the location to write the diagnostic input signal on the magnetic disk. The location may correspond to a cylinder and sector address. The controller 110 causes the read/write heads 104 to move into the proper location and sends the diagnostic input signal to the read/write channel 108 via interface 120. The read/write channel 108 receives and encodes the diagnostic input signal into analog signals. The read/write channel 108 passes the analog signals to the amplifiers 106 via interface 116. The amplifiers 106 amplify the analog signals and pass the amplified analog signals to the read/write heads 104. The read/write heads 104 impart the magnetic flux reversals onto the magnetic disks 102. The magnetic flux reversals represent the diagnostic input signal.

Figure 2:
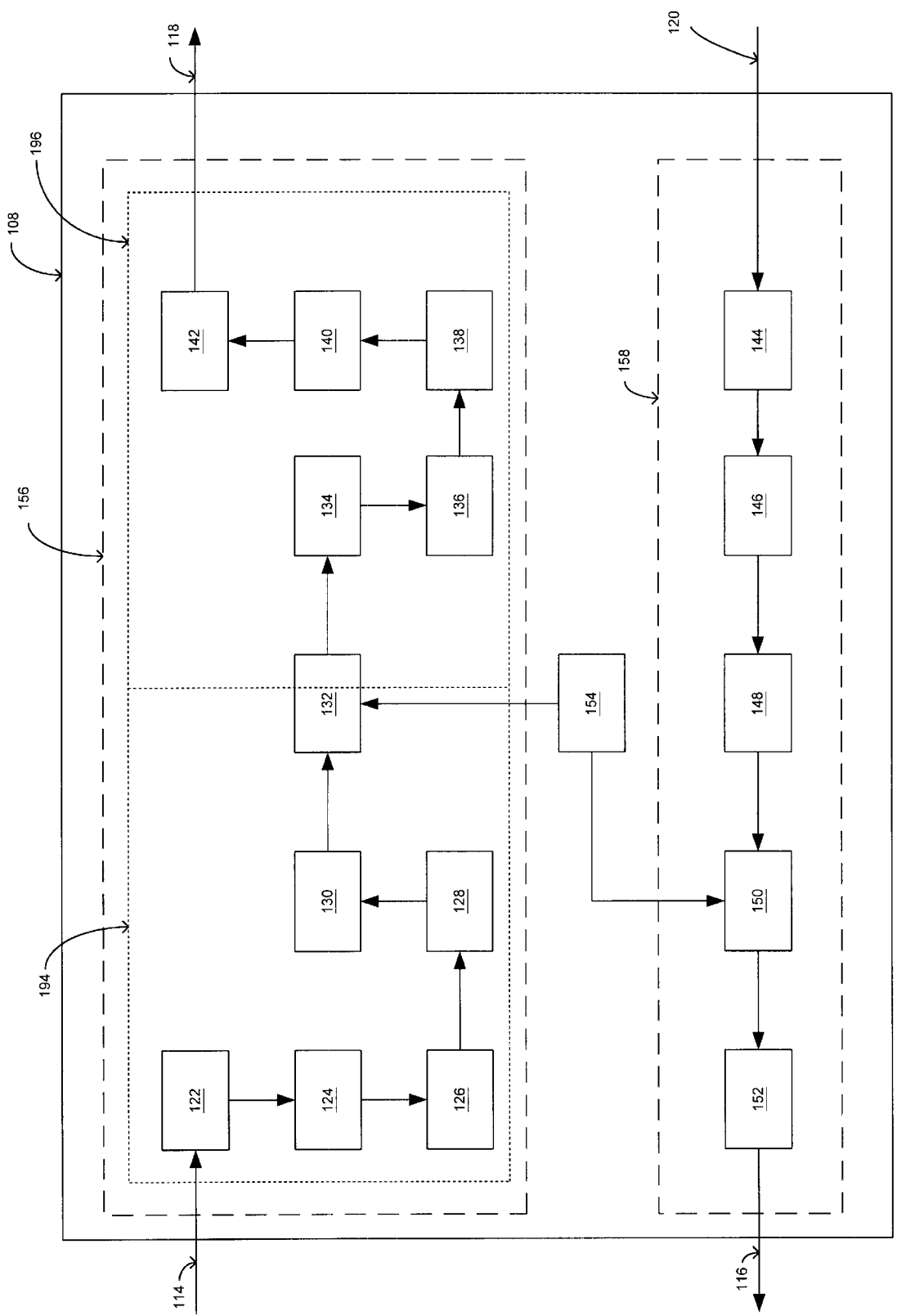
FIG. 2 represents a block diagram of the read/write channel in FIG. 1.

FIG. 2 represents a block diagram of the read/write channel 108 in FIG. 1. The read/write channel 108 has a diagnostic system as described below. The read/write channel 108 may be implemented as an integrated circuit, which may comprise a complementary metal oxide semiconductor (CMOS). In one aspect, the read/write channel 108 is implemented as an integrated circuit using a CMOS process at about 0.18 microns. The CMOS may include metal gates and polysilicon gates. The read/write channel 108 may have fewer or additional components and may have other configurations. Other integrated or non-integrated process technologies and other feature sizes may be used. The read/write channel 108 may be integrated with other circuitry comprising the disk drive electronics, such as the disk controller logic.

The read/write channel 108 may be divided into two sections, a read path 156 and a write path 158. The read path 156 may include an impedance and squelch control or input resistance 122, a variable gain amplifier (VGA) 124, a magnetic resistive asymmetry linearizer (MRA) 126, a continuous time filter (CTF) 128, a buffer 130, an analog to digital converter (ADC) 132, a finite impulse response (FIR) filter 134, an interpolated timing recovery (ITR) circuit 136, a Viterbi algorithm detector 138, a parity decoder 140, and a run-length-limited (RLL) decoder 142. The read path 156 may be divided into subparts such as an analog part 194 and a digital part 196. In one aspect, the analog part 194 includes the components from the impedance and squelch control 122 to the analog to digital converter 132. In this aspect, the digital part 196 includes the components from the analog to digital converter 132 to the RLL decoder 142.

The read/write channel 108 receives an amplified analog signal from the read/write heads 104. The amplified analog signal passes through an input resistance 122, which is a switching circuit to attenuate the signal. The attenuated signal passes to the VGA 124, which amplifies the signal. The amplified signal passes to the MRA 126, which adjusts the signal for distortion created by the recording process such as by a write pre-compensation circuit. The signal passes through the CTF 128 to filter out noise. The CTF 128 may be a low or band pass filter. The filtered signal passes to the ADC 132 via the buffer 130. The ADC 132 samples and converts the analog signal to digital form. The digital signal passes to a FIR filter 134 and then passes to a timing recovery circuit 136. The timing recovery circuit 136 may be connected (not shown) to the FIR filter 134, the MRA 126 and the VGA 124 in a feedback orientation to adjust these circuits according to the signals received and to compensate for timing. The FIR 134 may comprise a 10-tap or other number of tap FIR filter. The digital signal passes to the Viterbi algorithm detector 138, which determines the binary bit pattern represented by the digital signal using digital signal processing techniques. The Viterbi algorithm detector 138 may comprise a 32-state or other Viterbi processor. The binary data represented by the digital signal passes to the parity decoder 140, which removes the parity bit. The binary data passes to the RLL decoder 142, which decodes the RLL encoding symbols. The binary data passes to the controller 10 via the interface 118.

The write path 158 may include a parallel-to-serial converter 144, a runlength-limited (RLL) encoder 146, a parity encoder 148, a write pre-compensation circuit 150 and a driver circuit 152. The parallel-to-serial converter 144 receives data from the host device 112 via interface 120. The data transmission from the host device 112 may be about eight bits at a time. The converter 144 serializes the input data and sends the serial bit stream to the RLL encoder 146. The RLL encoder 146 encodes the serial bit stream into symbolic binary sequences, which may be according to a run-length limited algorithm for recording on the magnetic disks 102. The RLL encoder may use a 32/33-bit symbol code to ensure flux reversals are properly spaced and long runs of data without flux reversals are not recorded. The RLL encoded data passes to the parity encoder 148, which adds a parity bit to the data. The parity encoder 148 may use an odd parity to ensure long runs of 0's and 1's are not recorded due to the magnetic properties. The parity-encoded data may be subsequently treated as an analog signal rather than a digital signal. The analog signal passes to a write pre-compensation circuit 150, which dynamically adjusts the pulse widths of the bit stream to account for magnetic distortions in the recording process. The adjusted analog signal passes to a driver circuit 152, which drives the signal to the amplifiers 106 via interface 116. The driver circuit 152 drives the read/write heads 104 to record the signal on the magnetic disks 102. The driver circuit 152 may have a pseudo emitter coupled logic (PECL) driver circuit, which generates a differential output to the amplifiers 106.

The read/write channel 108 may also include a clock synthesizer 154. In one aspect, the clock synthesizer is coupled to the ADC 132 and is coupled to the write pre-compensation circuit 150. The clock synthesizer 154 generates clock signals used for operating the read/write channel 108. The clock synthesizer 154 may be a phased lock look (PLL) with a voltage controlled oscillator and various clock dividers to generate signals at different frequencies.

Figure 3:
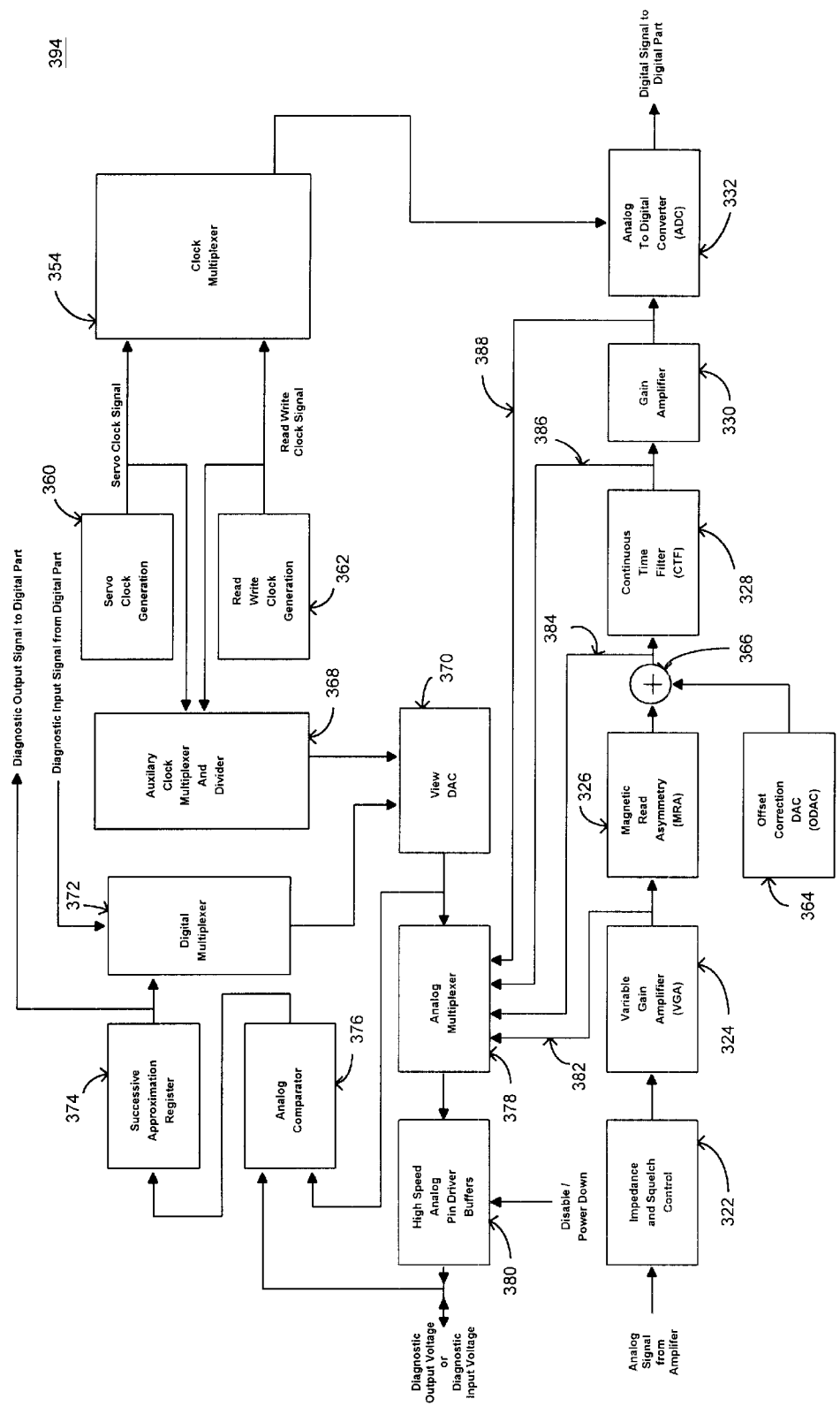
FIG. 3 represents a block diagram of a first embodiment of an analog part for a read path in a read/write channel having a diagnostic system.

FIG. 3 represents a block diagram of a first embodiment of an analog part 394 for a read path in a read/write channel having a diagnostic system. The analog part 394 may include impedance and squelch control 322, a variable gain amplifier (VGA) 324, a magneto-resistive asymmetry linearizer (MRA) 326, a continuous time filter (CTF) 328, a gain amplifier 330, and an analog to digital converter (ADC) 332. The analog part 394 also may include a clock multiplexer 354, a servo clock generator 360, a read/write clock generator 362, an offset correction digital to analog converter (DAC) 364, a summation device 366, an auxiliary clock multiplexer 368, a view digital to analog converter (DAC) 370, a digital multiplexer 372, a successive approximation register 374, an analog comparator 376, an analog multiplexer 378, and a pin driver buffer 380. The analog part 394 may have fewer or additional components and other configurations.

The analog part 394 receives a magnetically generated analog signal or voltage from one or more read/write heads (not shown). The magnetically generated analog signal passes through the impedance and squelch control 322, which may attenuate the signal. The analog signal passes to the VGA 324, which amplifies the magnetically generated signal. The amplified signal passes to the MRA 326, which adjusts the signal for distortion created by the recording process. The adjusted signal is combined at the summation device 366 with an offset correction signal from the offset correction DAC 364. The offset-corrected adjusted signal passes through the CTF 328 to filter out noise and pre-equalize the signal (the filter boosts parts of the signal depending on the frequency content). The filtered signal passes through the gain amplifier 330, which provides a processed signal to the ADC 332. The clock multiplexer 354 provides a servo clock signal from the servo clock generator 360 and a read/write clock signal from the read/write clock generator 362 to the ADC 332. In response to the clock signals, the ADC 332 samples and converts the analog signal into digital form during and at the appropriate time. The ADC 332 provides the digital signal to the digital part (not shown) of the read/write channel.

In this embodiment, the diagnostic system comprises the auxiliary clock multiplexer 368 with clock signals from the servo clock generator 360 and the read/write clock generator 362, the view DAC 370, the digital multiplexer 372, the successive approximation register 374, the analog comparator 376, the analog multiplexer 378, and the pin driver buffer 380. The diagnostic system may comprise fewer or additional components and may have different configurations. The diagnostic system may be used to determine the performance of the read/write channel.

The view DAC 370, analog comparator 376, and successive approximation register 374 perform a bit-weighing conversion to generate the diagnostic output signal from the diagnostic input voltage. "Bit-weighing" includes binary-weighting, bit-weighting, and like terms. In one aspect, the analog comparator 376 receives an analog output voltage from the view DAC 370 and generates a digital output signal as an input to the successive approximation register 374. Initially and upon reset, the register value of the MSB is set to high (H) or 1. All other bits are set to low (L) or 0. The analog comparator 376 compares the diagnostic input voltage against the analog output voltage from the view DAC 370. If the analog output voltage is lower than the diagnostic input voltage, the resister value for MSB is set to 0 and the second MSB or MSB-1 is set to high (H) or 1. Otherwise, the MSB is high (H) or 1 and the second MSB (MSB-1) is set to high (H) or 1. The register value (high or low, 1 or 0) from the analog comparator 376 may be provided to the view DAC 370 as a correction before the analog comparator 376 cycles to the next comparison. The successive approximation register 374 holds the register values from the analog comparator 376. The view DAC 370, analog comparator 376, the successive approximation register 374 continue this weighing and shifting process until the least significant bit (LSB) of the view DAC 370 is resolved. The successive approximation register 374 provides the successive register values as the diagnostic output signal.

The view DAC 370 receives and converts the diagnostic input signal into an analog output voltage. The view DAC 370 may have a resolution of about seven bits. The auxiliary clock multiplexer 368 provides the servo clock signal from the servo clock generator 360 or the read/write clock signal from the read/write clock generator 362 to the view DAC 370. The clock signals control the timing and duration of the diagnostic testing and the read/write operation. The digital multiplexer 372 provides the digital output from the successive approximation register 374 and the diagnostic input signal from the digital part (not shown) to the view DAC 370. The diagnostic input signal may represent the operating performance of one or more components in the read/write channel. The view DAC 370 provides the analog output voltage to the analog multiplexer 378 and to the analog comparator 376.

The analog multiplexer 378 provides the analog output voltage from the view DAC 370 and one or more analog test signals 382, 384, 386, and 388 from components in the read/write channel to the pin driver buffer 380. The analog test signals may comprise one or more of the amplified signal 382 from the VGA 324, the offset-corrected signal 389 from the summation device 366, the filtered signal 386 from the CTF 328, and the processed signal 388 prior to the ADC 332. The pin driver buffer 380 may comprise one or more high-speed pin driver buffers. The pin driver buffer 380 may have a disable or power-down input that may be controlled through a register bit by the digital part. In one aspect, the disable or power-down input forces the output of the pin driver buffers 380 to high impedance so an external source may provide an auxiliary diagnostic input voltage to the analog comparator 376 using the same pins.

Figure 4:
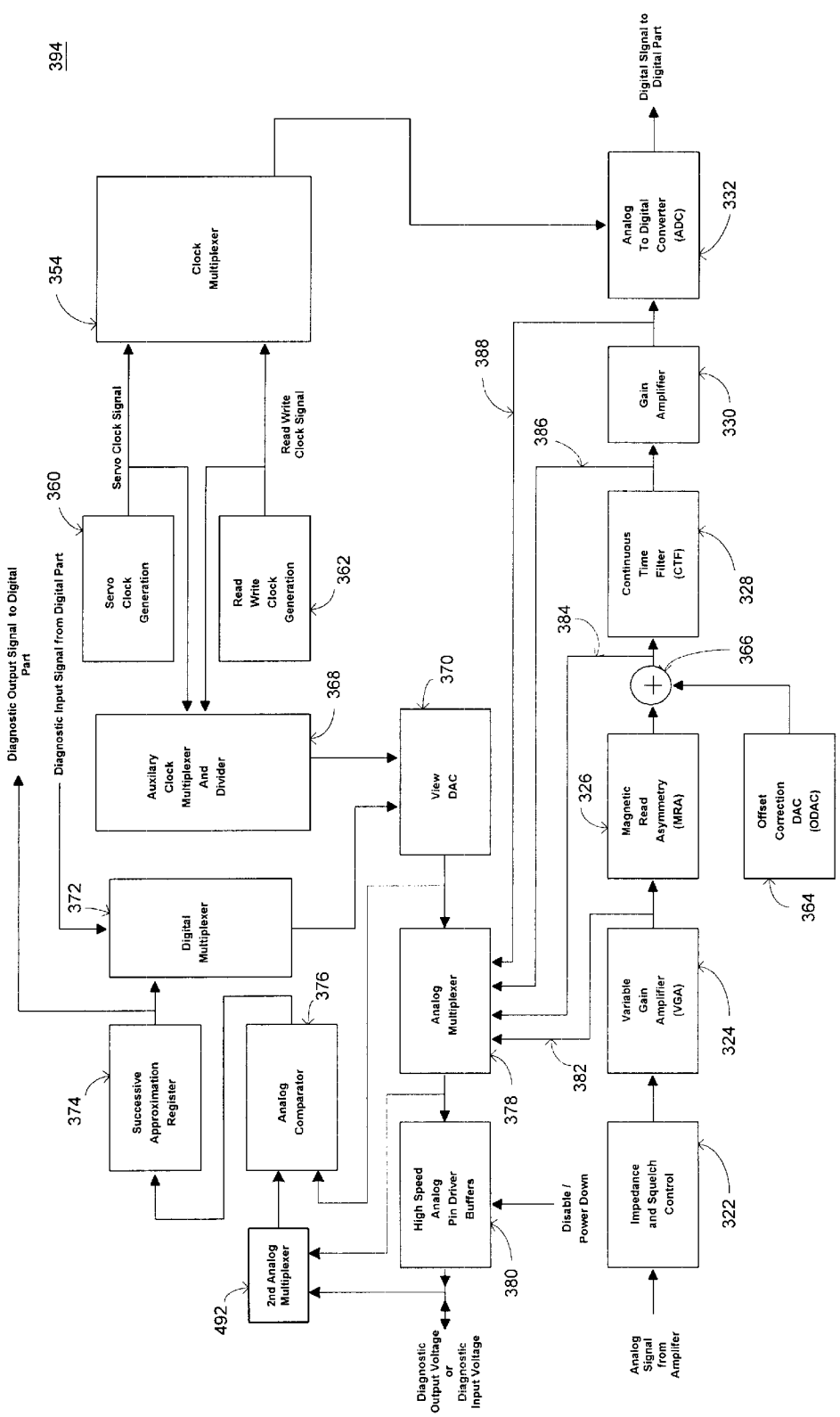
FIG. 4 represents a block diagram of a second embodiment of an analog part for a read path in a read/write channel having a diagnostic system.

FIG. 4 represents a block diagram of a second embodiment of an analog part 494 for a read path in a read/write channel having a diagnostic system. The analog part 494 is substantially the same as the analog part 394 described in FIG. 3 except for the use of a second analog multiplexer 492. The second analog multiplexer 492 provides the analog signals from the analog multiplexer 378 and the auxiliary diagnostic input voltage to the analog comparator 376. The analog signals from the analog multiplexer include the analog output voltage from the view DAC 370 and one or more analog test signals 382, 384, 386, and 388. The analog comparator 376 may be used to compare or measure on-chip signals, such as the analog signals from the analog multiplexer, against the analog output voltage from the view DAC 370. The analog comparator 376 also may be used to compare or measure external signals, such as the auxiliary diagnostic input voltage, against the analog output voltage from the view DAC 370.

Various embodiments of the invention have been described and illustrated. However, the description and illustrations are by way of example only. Other embodiments and implementations are possible within the scope of this invention and will be apparent to those of ordinary skill in the art. Therefore, the invention is not limited to the specific details, representative embodiments, and illustrated examples in this description. Accordingly, the invention is not to be restricted except in light as necessitated by the accompanying claims and their equivalents.

What is claimed is:

1. A disk drive, comprising:
   a read/write channel implemented on an integrated circuit;
   a diagnostic system having bit-weighing conversion and having a diagnostic output responsive to a diagnostic input voltage, where the diagnostic system comprises,
      a digital to analog converter having an analog output responsive to a diagnostic input signal,
      an analog comparator coupled to compare the diagnostic input voltage with the analog output,
      a successive approximation register coupled to receive at least one register value from the analog comparator, the successive approximation register having the diagnostic output responsive to the at least one register value, a first analog multiplexer coupled to receive the analog output from the digital to analog converter, where the first analog multiplexer is coupled to receive at least one test signal from the read/write channel, and a second analog multiplexer coupled to receive the at least one test signal from the first analog multiplexer, where the second analog multiplexer is coupled to receive the diagnostic input voltage, and where the analog comparator is coupled to receive the at least one test signal and the diagnostic input voltage from the second analog multiplexer.

2. The disk drive according to claim 1, further comprising:

at least one magnetic disk; and at least one read/write head operatively disposed adjacent to the magnetic disk, the at least one read/write head coupled to the read/write channel.

3. The disk drive according to claim 1, where the read/write channel further comprises:

a variable gain amplifier (VGA) coupled to receive a magnetically-generated signal from the at least one read/write head;

a magnetic resistive asymmetry (MRA) linearizer coupled to receive an amplified signal from the VGA;

a summation device coupled to combine an adjusted signal from the MRA linearizer with an offset correction signal from an offset correction digital to analog converter;

a continuous time filter (CTF) coupled to receive an offset-corrected adjusted signal from the summation device;

a gain amplifier coupled to receive a filtered signal from the CTF;

an analog to digital converter coupled to receive a processed signal from the gain amplifier, and where the at least one test signal is at least one of the amplified signal, the offset-corrected adjusted signal, the filtered signal, and the processed signal.

4. The disk drive according to claim 1, where the diagnostic system further comprises a pin driver buffer coupled to receive the analog output from the digital to analog converter.

5. The disk drive according to claim 1, where the diagnostic system further comprises a clock multiplexer coupled to provide at least one clock signal to the digital to analog converter.

6. The disk drive according to claim 5, where the read/write channel further comprises a servo clock generator and a read/write clock generator, where the clock multiplexer is coupled to receive a servo clock signal from the servo clock generator, and where the clock multiplexer is coupled to receive a read/write clock signal from the read/write clock generator.

7. The disk drive according to claim 1, where the integrated circuit comprises a complementary metal oxide semiconductor.

8. The disk drive according to claim 1, where the read/write channel comprises partial response maximum likelihood (PRML) encoding and decoding.

9. A disk drive, comprising:

a read/write channel implemented on an integrated circuit;

a diagnostic system having bit-weighing conversion and having a diagnostic output responsive to a diagnostic input voltage, where the diagnostic system comprises, a digital to analog converter having an analog output responsive to a diagnostic input signal, an analog comparator coupled to compare the diagnostic input voltage with the analog output, a successive approximation register coupled to receive at least one register value from the analog comparator, the successive approximation register having the diagnostic output responsive to the at least one register value, and a digital multiplexer coupled to provide the diagnostic input signal to the digital to analog converter, and where the digital multiplexer is coupled to receive the diagnostic output signal from the successive approximation register.

10. A disk drive, comprising:

a diagnostic system having bit-weighing conversion and having a diagnostic output responsive to a diagnostic input voltage, where the diagnostic system comprises, a digital to analog converter having an analog output responsive to a diagnostic input signal, an analog comparator coupled to compare the diagnostic input voltage with the analog output, and a successive approximation register coupled to receive at least one register value from the analog comparator, the successive approximation register having the diagnostic output responsive to the at least one register value; and a read/write channel implemented on an integrated circuit, where the read/write channel comprises a digital part to receive the diagnostic output signal, where the digital part provides the a diagnostic input signal to the digital to analog converter.

11. A read/write channel for a disk drive, where the read/write channel is implemented on an integrated circuit, the read/write channel comprising:

a digital to analog converter coupled to receive at least one clock signal, the digital to analog converter having an analog output responsive to a diagnostic input signal and the at least one clock signal;

an analog comparator coupled to compare a diagnostic input voltage with the analog output from the digital to analog converter;

a successive approximation register coupled to receive at least one register value from the analog comparator, the successive approximation register having a diagnostic output responsive to the at least one register value;

a first analog multiplexer coupled to receive the analog output from the digital to analog converter, where the first analog multiplexer is coupled to receive the at least one test signal; and a second analog multiplexer coupled to receive the at least one test signal from the first analog multiplexer, where the analog comparator is coupled to receive the at least one test signal and the diagnostic input voltage from the second analog multiplexer.

12. A read/write channel for a disk drive, where the read/write channel is implemented on an integrated circuit, the read/write channel comprising:

a digital to analog converter coupled to receive at least one clock signal, the digital to analog converter having an analog output responsive to a diagnostic input signal and the at least one clock signal;

an analog comparator coupled to compare a diagnostic input voltage with the analog output from the digital to analog converter;

a successive approximation register coupled to receive at least one register value from the analog comparator, the successive approximation register having a diagnostic output responsive to the at least one register value; and a digital multiplexer coupled to provide the diagnostic input signal to the digital to analog converter, and where the digital multiplexer is coupled to receive the diagnostic output signal from the successive approximation register.

13. A read/write channel for a disk drive, where the read/write channel has partial response maximum likelihood (PRML) encoding and decoding, and where the read/write channel is implemented on a complementary metal oxide semiconductor, the read/write channel comprising:

a digital multiplexer;

at least one clock generator;

a digital to analog converter coupled to receive a diagnostic input signal from the digital multiplexer and coupled to receive at least one clock signal from the at least one clock generator, the digital to analog converter having an analog output responsive to the diagnostic input signal and the at least one clock signal;

a first analog multiplexer coupled to receive the analog output from the digital to analog converter;

a pin driver buffer coupled to receive the analog output and at least one test signal from the first analog multiplexer;

an analog comparator coupled to receive the analog output from the digital to analog converter, the analog comparator to compare the analog output with the diagnostic input voltage; and a successive approximation register coupled to receive at least one register value from the analog comparator, the successive approximation register having a diagnostic output responsive to the at least one register value, where the digital multiplexer is coupled to receive the diagnostic output signal from the successive approximation register.

14. The read/write channel according to claim 13, further comprising:

a second analog multiplexer coupled to receive the at least one test signal from the first analog multiplexer, where the analog comparator is coupled to receive the at least one test signal and the diagnostic input voltage from the second analog multiplexer, and where the analog comparator compares the at least one test signal and the diagnostic input voltage with the analog output.

* * * * *

UNITED STATES PATENT AND TRADEMARK OFFICE
CERTIFICATE OF CORRECTION

PATENT NO.   : 6,552,865 B2
DATED        : April 22, 2003
INVENTOR(S)  : Sasan Cyrusian It is certified that error appears in the above-identified patent and that said Letters Patent is hereby corrected as shown below:

Title page,
Item [56], References Cited, U.S. PATENT DOCUMENTS, insert the following:

-- US-2002/0176299     11/2002     Ruegg et al. --.
OTHER PUBLICATIONS, insert -- html_ -- before "index".

Signed and Sealed this

Tenth Day of August, 2004

JON W. DUDAS
*Acting Director of the United States Patent and Trademark Office*